(12) United States Patent
Huang et al.

(10) Patent No.: US 12,470,145 B2
(45) Date of Patent: Nov. 11, 2025

(54) MULTIPHASE SWITCHING CONVERTER WITH STACKABLE CONTROLLERS

(71) Applicant: Monolithic Power Systems, Inc., Kirkland, WA (US)

(72) Inventors: Daocheng Huang, Santa Clara, CA (US); Fangyu Zhang, Hangzhou (CN); Ming Chen, Hangzhou (CN)

(73) Assignee: Monolithic Power Systems, Inc., Kirkland, WA (US)

( * ) Notice: Subject to any disclaimer, the term of this patent is extended or adjusted under 35 U.S.C. 154(b) by 300 days.

(21) Appl. No.: 18/073,382

(22) Filed: Dec. 1, 2022

(65) Prior Publication Data

US 2024/0186902 A1 Jun. 6, 2024

(51) Int. Cl.
*H02M 3/158* (2006.01)
*H02M 1/00* (2007.01)

(52) U.S. Cl.
CPC ....... *H02M 3/1586* (2021.05); *H02M 1/0009* (2021.05)

(58) Field of Classification Search
CPC ..... H02M 1/0009; H02M 3/1584; H02M 3/86
See application file for complete search history.

(56) References Cited

U.S. PATENT DOCUMENTS

| | | |
|---|---|---|
| 8,493,044 B2 | 7/2013 | Xu |
| 9,081,397 B2 | 7/2015 | Jiang |
| 9,270,178 B2 | 2/2016 | Jiang |
| 9,407,148 B2 | 8/2016 | Guo |
| 9,912,240 B1 | 3/2018 | Nguyen |
| 9,941,781 B2 | 4/2018 | Hu |
| 10,270,343 B2 | 4/2019 | Nguyen |
| 10,523,106 B2 | 12/2019 | Li |
| 11,081,954 B2 | 8/2021 | Jiang |
| 11,342,848 B2 | 5/2022 | Luo |
| 11,349,383 B2 | 5/2022 | Jiang |
| 11,356,023 B2 | 6/2022 | Jiang |
| 11,387,736 B2 | 7/2022 | Luo |
| 2012/0274293 A1 * | 11/2012 | Ren .............. H02M 3/1584 323/271 |
| 2018/0337599 A1 * | 11/2018 | Chen .............. H02M 3/158 |
| 2024/0088791 A1 * | 3/2024 | Hosotani .......... H02M 1/088 |

FOREIGN PATENT DOCUMENTS

WO   WO-2022158388 A1 *  7/2022  .......... H02M 1/0009

OTHER PUBLICATIONS

U.S. Appl. No. 17/184,093, filed Sep. 16, 2021, Suhua Luo.
U.S. Appl. No. 17/555,757, filed Aug. 4, 2022, Lijie Jiang.
U.S. Appl. No. 17/570,708, filed Aug. 4, 2022, Lijie Jiang.

* cited by examiner

*Primary Examiner* — Sean Kayes
*Assistant Examiner* — Jennifer C Caulk
(74) *Attorney, Agent, or Firm* — Perkins Coie LLP

(57) ABSTRACT

A controller for a multiphase switching converter has a logic circuit, to provide a plurality of switching control signals to control the plurality of switching circuits. When as a master controller, the controller provides a first total current signal based on a sum of a plurality of currents flowing through the plurality of switching circuits. When as a slave controller, the controller receives the first total current signal, provides a second total current signal based on the sum of the plurality of currents flowing through the plurality of switching circuits, and turns on the plurality of switching circuits in sequence based on the first total current signal and the second total current signal.

16 Claims, 13 Drawing Sheets

MULTIPHASE SWITCHING CONVERTER WITH STACKABLE CONTROLLERS

TECHNICAL FIELD

The present invention generally relates to electronic circuits, and more particularly but not exclusively, to multiphase switching converter.

BACKGROUND OF THE INVENTION

Recently, with emergence of high-performance processors, switching converters with smaller output voltages and larger output currents are needed, with higher and higher requirements on thermal performance and transient response performance. Multiphase switching converters are widely used because of their superior performance. A multiphase switching converter comprises a plurality of switching circuits, each switching circuit forms one phase, and outputs of the plurality of switching circuits are coupled together to provide an output voltage to a load.

Traditionally, the multiphase switching converter needs to provide each phase an individual switching control signal. However, if the phase number is larger than the number of switching control signals a controller could provide, then one switching control signal need to handle two or more phases, which may cause new problems.

SUMMARY OF THE INVENTION

It is one of the objects of the present invention to provide multiphase switching converter, controller and associated control method.

Embodiments of the present invention are also directed to a controller for a multiphase switching converter. The multiphase switching converter has a plurality of switching circuits coupled in parallel to provide an output voltage. The controller comprises a logic circuit, configured to provide a plurality of switching control signals to control the plurality of switching circuits. When the controller is configured as a master controller, the master controller is configured to provide a first total current signal based on a sum of a plurality of currents flowing through the plurality of switching circuits, and the master controller is configured to turn on the plurality of switching circuits in sequence via the plurality of switching control signals based on the output voltage. When the controller is configured as a slave controller, the slave controller is coupled to the master controller to receive the first total current signal, the slave controller is configured to provide a second total current signal based on the sum of the plurality of currents flowing through the plurality of switching circuits, and is configured to turn on the plurality of switching circuits in sequence via the plurality of switching control signals based on the first total current signal and the second total current signal.

Embodiments of the present invention are further directed to a control method for a controller of a multiphase switching converter. The multiphase switching converter has a plurality of switching circuits coupled in parallel to provide an output voltage. The control method comprises providing a plurality of switching control signals to control the plurality of switching circuits. When the controller is a master controller, providing a first total current signal based on a sum of a plurality of currents flowing through the plurality of switching circuits, and turning on the plurality of switching circuits in sequence via the plurality of switching control signals based on the output voltage. When the controller is a slave controller, receiving the first total current signal from the master controller, providing a second total current signal based on the sum of the plurality of currents flowing through the plurality of switching circuits, and turning on the plurality of switching circuits in sequence via the plurality of switching control signals based on the first total current signal and the second total current signal.

Embodiments of the present invention are directed to a multiphase switching converter, comprising a first plurality of switching circuits and a second plurality of switching circuits, a master controller and a slave controller. Each of the first and the second plurality of switching circuits is coupled in parallel to provide an output voltage. The master controller is configured to provide a first total current signal based on a sum of a plurality of currents flowing through the first plurality of switching circuits, and provide a first plurality of switching control signals based on the output voltage to control the first plurality of switching circuits. The slave controller is coupled to the master controller to receive the first total current signal. The slave controller is configured to provide a second total current signal based on a sum of a plurality of currents flowing through the second plurality of switching circuits, and is configured to provide a second plurality of switching control signals based on the first total current signal and the second total current signal to control the second plurality of switching circuits.

These and other features of the present invention will be readily apparent to persons of ordinary skill in the art upon reading the entirety of this disclosure, which includes the accompanying drawings and claims.

BRIEF DESCRIPTION OF DRAWINGS

The present invention can be further understood with reference to the following detailed description and the appended drawings, wherein like elements are provided with like reference numerals.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Reference to "one embodiment", "an embodiment", "an example" or "examples" means: certain features, structures, or characteristics are contained in at least one embodiment of the present invention. These "one embodiment", "an embodiment", "an example" and "examples" are not necessarily directed to the same embodiment or example. Furthermore, the features, structures, or characteristics may be combined in one or more embodiments or examples. In addition, it should be noted that the drawings are provided for illustration, and are not necessarily to scale. And when an element is described as "connected" or "coupled" to another element, it can be directly connected or coupled to the other element, or there could exist one or more intermediate elements. In contrast, when an element is referred to as "directly connected" or "directly coupled" to another element, there is no intermediate element. When a signal is described as "equal to" another signal, it is substantially identical to the other signal.

Embodiments of the present invention proposes a multiphase switching converter with stackable controllers. At least two controllers can be stacked and work in parallel, one controller is master and the others are slave.

Figure 1:
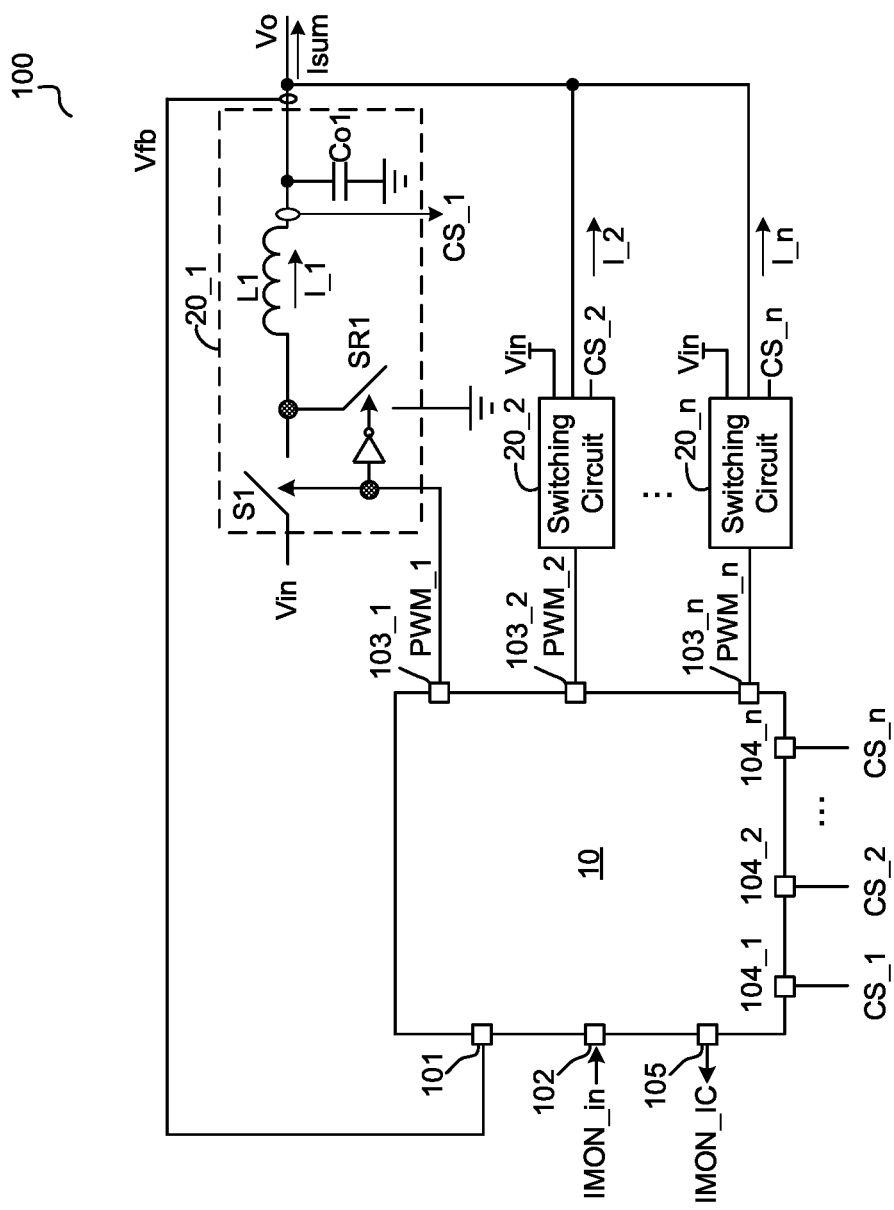
FIG. 1 is a schematic block diagram of a multiphase switching converter 100 in accordance with an embodiment of the present invention.

FIG. 1 is a schematic block diagram of a multiphase switching converter 100 in accordance with an embodiment of the present invention. The multiphase switching converter 100 has a controller 10 and a plurality of switching circuits 20 (e.g., 20_1, 20_2 . . . 20_$n$ shown in FIG. 1, where n is an integer greater than or equal to two) coupled in parallel to provide an output voltage Vo from an input voltage Vin. The controller 10 comprises a feedback pin 101, a feedback pin 102, a reference pin 105 and a plurality of switching control pins 103 (e.g., 103_1, 103_2 . . . 103_$n$). The feedback pin 101 is configured to receive a feedback signal Vfb representative of the output voltage Vo. The plurality of switching control pins 103 are configured to provide a plurality of switching control signals PWM (e.g., PWM_1, PWM_2 . . . PWM_n) to control the plurality of switching circuits 20. The controller 10 is capable of being configured as a master controller or a slave controller, to co-work with other controllers. The reference pin 105 is configured to provide a total current signal IMON_IC based on a plurality of currents (I_1, I_2 . . . I_n) flowing through the plurality of switching circuits 20, e.g., based on a sum of the plurality of currents flowing through the plurality of switching circuits 20 (I_1+I_2+ . . . I_n). The sum of the plurality of currents flowing through the plurality of switching circuits 20 (I1_1+I_2+ . . . I_n) is a total current Isum provided by the plurality of switching circuits 20. In one embodiment, when the controller 10 is configured as the slave controller, the feedback pin 102 is configured to receive the total current signal IMON_IC of the master controller as its total current signal IMON_in. In one embodiment, the controller 10 further has a plurality of current sense pins 104 (e.g., 104_1, 104_2 . . . 104_$n$), to receive a plurality of current sense signals CS (e.g., CS_1, CS_2 . . . CS_n) representative of the plurality of currents (I_1, I_2 . . . I_n) flowing through the plurality of switching circuits 20. One with ordinary skill in the art should understand that the switching circuits 20 can employ any suitable topology, such as synchronous or asynchronous step-up/step-down converters, forward converters, flyback converters, and so on. FIG. 1 shows one example of the switching circuit 20_1 for illustration, and switching circuits 20_2 . . . 20_$n$ is similar with the switching circuit 20_1. In FIG. 1, the switching circuit 20_1 has a high-side switch S1, a low-side switch SR1, an inductor L1, and an output capacitor Co1. The high-side switch S1 and the low-side switch SR1 are turned on complementary under control of the switching control signal PWM_1. The current I_1 flowing through the switching circuit 20_1 may be a current flowing through the inductor L1, a current flowing through the high-side switch S1 or a current flowing through the low-side switch SR1.

Figure 2:
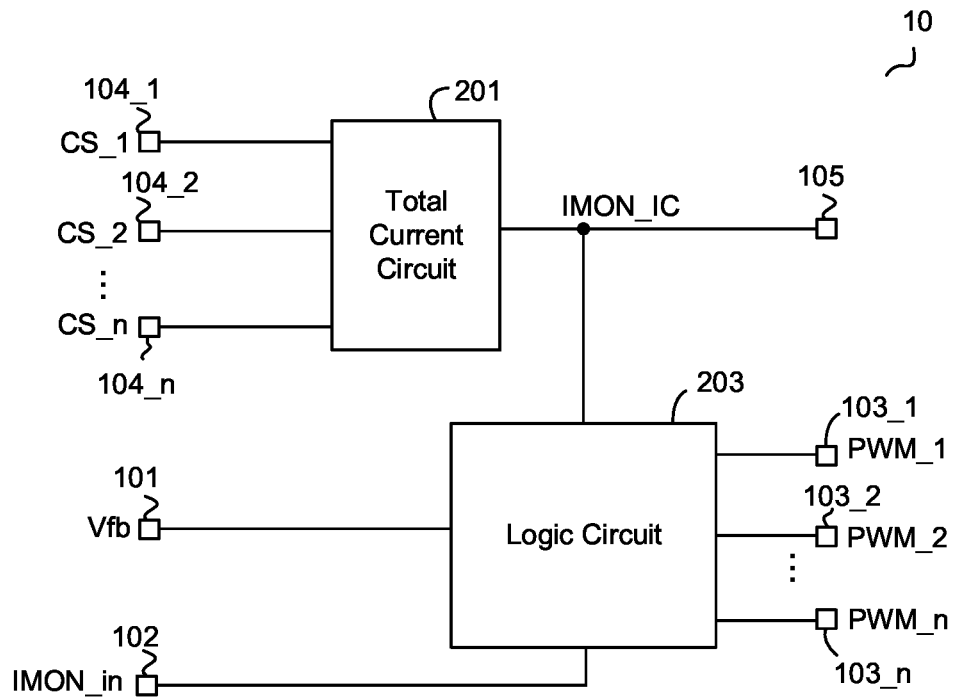
FIG. 2 is a schematic diagram of a controller 10 shown in FIG. 1 in accordance with an embodiment of the present invention.

FIG. 2 is a schematic diagram of the controller 10 shown in FIG. 1 in accordance with an embodiment of the present invention. The controller 10 comprises a total current circuit 201 and a logic circuit 203.

The total current circuit 201 provides the total current signal IMON_IC based on the sum of the plurality of currents flowing through the switching circuits 20. For example, as shown in FIG. 2, the total current circuit 201 receives the plurality of current sense signals CS, and provides the total current signal IMON_IC based on a sum of the plurality of current sense signals CS (CS_1+ CS_2+ . . . +CS_n). The logic circuit 203 provides the switching control signals PWM to control the switching circuits 20. In one embodiment, when the controller 10 is configured as the master controller, the logic circuit 203 provides the switching control signals PWM based on the output voltage Vo. When the controller 10 is configured as the slave controller, the logic circuit 203 provides switching control signals PWM based on the total current signal IMON_IC and the total current signal IMON_in.

With embodiments of the present invention, several controllers 10 could be stackable to drive each switching circuit 20 by one individual switching control signal PWM, thus current balance could be achieved easily.

Figure 3:
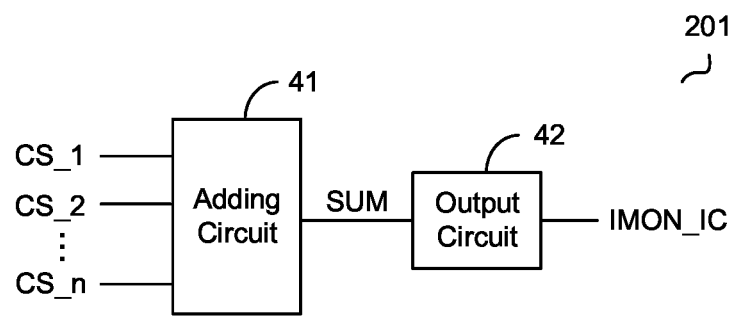
FIG. 3 is a schematic diagram of a total current circuit 201 as shown in FIG. 2 in accordance with an embodiment of the present invention.

FIG. 3 is a schematic diagram of the total current circuit 201 as shown in FIG. 2 in accordance with an embodiment of the present invention. In the embodiment shown in FIG. 3, the total current circuit 201 comprises an adding circuit 41 and an output circuit 42. The adding circuit 41 provides a sum signal SUM based on the sum of the plurality of current sense signals CS (CS_1+CS_2+ . . . +CS_n). The output circuit 42 receives the sum signal SUM and provides the total current signal IMON_IC accordingly. The output circuit 42 may comprises a bias circuit, a proportional circuit and/or an output buffer. One with ordinary skill in the art should understand that the total current circuit 201 is not limited by FIG. 3, other suitable circuit may also be employed.

Figure 4:
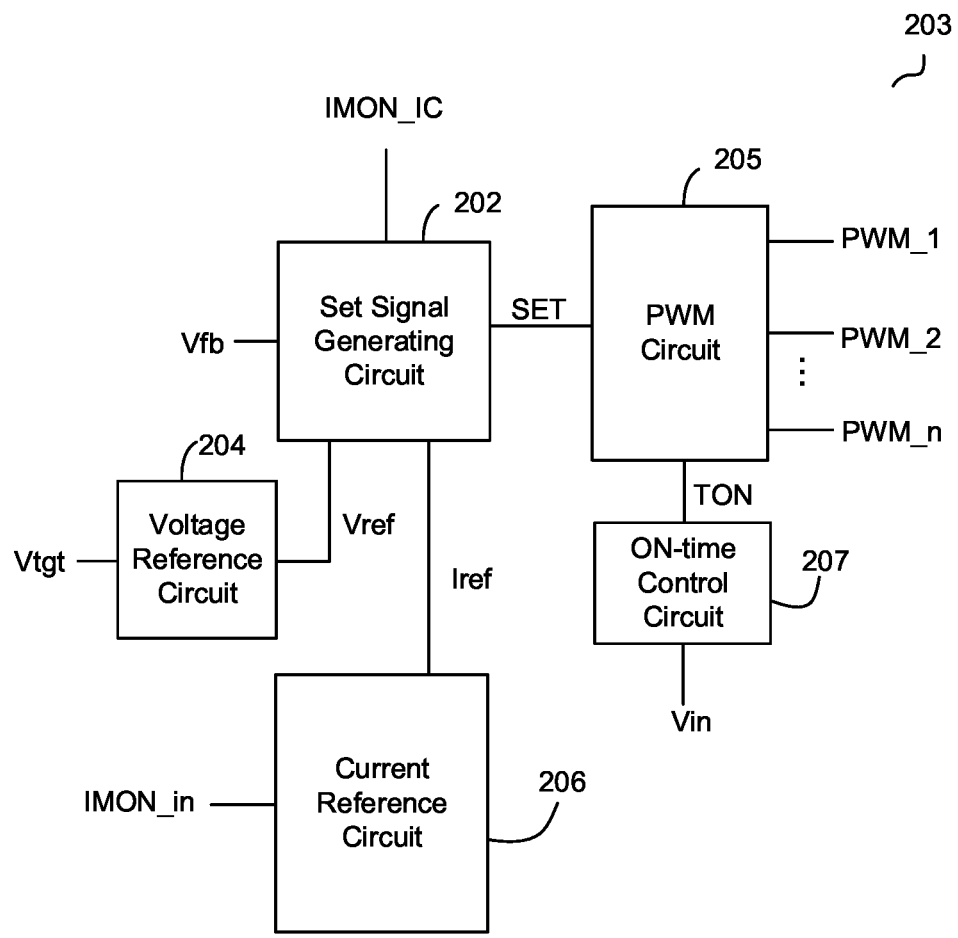
FIG. 4 is a schematic diagram of a logic circuit 203 as shown in FIG. 2 in accordance with an embodiment of the present invention.

FIG. 4 is a schematic diagram of the logic circuit 203 shown in FIG. 2 in accordance with an embodiment of the present invention. In the example shown in FIG. 4, the logic circuit 203 comprises a voltage reference circuit 204, a current reference circuit 206, a set signal generating circuit 202, and a PWM (Pulse Width Modulation) circuit 205. In one embodiment, the voltage reference circuit 204 receives a desired output voltage Vtgt, and provides a voltage reference signal Vref based on the desired output voltage Vtgt when the controller 10 is configured as the master controller. The desired output voltage Vtgt relates to a voltage level that the output voltage should be regulated to, and may be programmable via a communication bus. In one embodiment, the current reference circuit 206 receives the total current signal IMON_in from the master controller, and provides a current reference signal Iref based on the total current signal IMON_in when the controller is configured as the slave controller. The set signal generating circuit 202 provides a set signal SET to turn on the switching circuits 20 in sequence based on the feedback signal Vfb, the voltage reference signal Vref, the total current signal IMON_IC, and the current reference signal Iref. In one embodiment, when the controller 10 is configured as the master controller, the set signal SET is provided based on the feedback signal Vfb and the voltage reference signal Vref, when the controller 10 is configured as the slave controller, the set signal SET is provided based on the total current signal IMON_IC and the current reference signal Iref. The PWM circuit 205 provides the switching control signals PWM based on the set signal SET and an ON-time control signal TON. In one embodiment, the PWM circuit 205 is configured to turn off one of the switching circuits 20 when an ON-time period of the one of the switching circuits 20 reaches a time threshold adjusted by the ON-time control signal TON. In one embodiment, the ON-time control signal TON is provided by an ON-time control circuit 207. The ON-time control signal TON may be constant or may vary with the input voltage Vin received by the multiphase converter 100.

Figure 5:
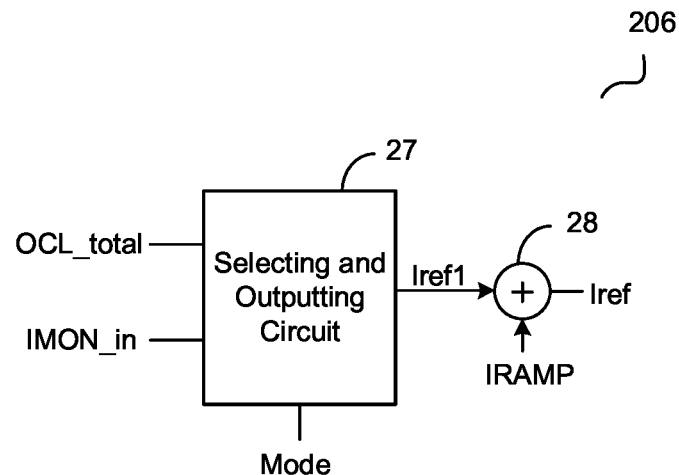
FIG. 5 is a schematic diagram of a current reference circuit 206 as shown in FIG. 4 in accordance with an embodiment of the present invention.

FIG. 5 is a schematic diagram of the current reference circuit 206 as shown in FIG. 4 in accordance with an embodiment of the present invention. In one embodiment, when the controller 10 is the master controller, the current reference circuit 206 provides the current reference signal Iref based on a current limit threshold OCL_Total, and when the controller 10 is the slave controller, the current reference circuit 206 provides the current reference signal Iref based on the total current signal IMON_in. The current limit threshold OCL_Total may be constant or may be adjusted via the communication bus to adjust a maximum value of the total current Isum provided by the plurality of switching circuits 20. In the example of FIG. 5, the current reference circuit 206 comprises a selecting and outputting circuit 27. The selecting and outputting circuit 27 receives the current limit threshold OCL_Total, the total current signal IMON_in, and a mode signal Mode, and provides a reference signal Iref1. In one embodiment, when the mode signal Mode indicates that the controller 10 is the master controller, the selecting and outputting circuit 27 provides the reference signal Iref1 based on the current limit threshold OCL_Total, and when the mode signal Mode indicates that the controller is the slave controller, the selecting and outputting circuit 27 provides the reference signal Iref1 based on the total current signal IMON_in. In one embodiment, the current reference signal Iref equals the reference signal Iref1. In another embodiment, the current reference signal Iref equals a sum of the reference signal Iref1 and a ramp signal IRAMP. The ramp signal IRAMP may be employed for stability. As shown in FIG. 5, the current reference circuit 206 further comprises an operation circuit 28. The operation circuit 28 receives the ramp signal IRAMP and the reference signal Iref1, and provides the current reference signal Iref by adding the ramp signal IRAMP to the reference signal Iref1. One with ordinary skill in the art should understand that the current reference circuit 206 is not limited by the detailed circuit structure shown in FIG. 5, other circuit structure may also be employed without detracting merits of the present invention.

Figure 6:
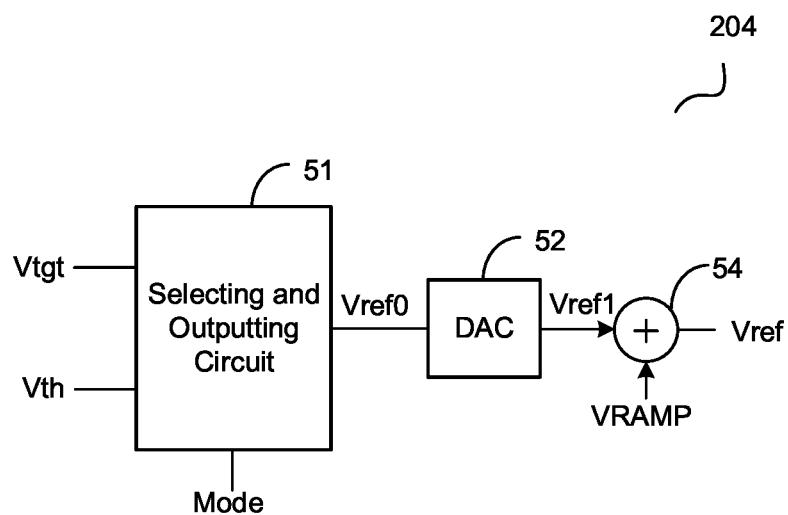
FIG. 6 is a schematic diagram of a voltage reference circuit 204 as shown in FIG. 4 in accordance with an embodiment of the present invention.

FIG. 6 is a schematic diagram of the voltage reference circuit 204 as shown in FIG. 4 in accordance with an embodiment of the present invention. In one embodiment, when the controller 10 is the master controller, the voltage reference signal Vref is provided based on the desired output voltage Vtgt, and when the controller 10 is the slave controller, the voltage reference signal Vref is increased, e.g., be provided based on a threshold voltage Vth which is larger than the desired output voltage Vtgt. The threshold voltage Vth may be a maximum threshold voltage Vmax, or a sum of the desired output voltage Vtgt and a threshold voltage DeltaV. The maximum threshold voltage Vmax is predetermined and larger than the desired output voltage Vtgt. In one example as shown in FIG. 6, the voltage reference circuit 204 comprises a selecting and outputting circuit 51. In one embodiment, the selecting and outputting circuit 51 receives the mode signal Mode, the desired output voltage Vtgt, and the threshold voltage Vth, and provides a reference signal Vref0. When the mode signal Mode indicates that the controller 10 is the master controller, the selecting and outputting circuit 51 provides the reference signal Vref0 based on the desired output voltage Vtgt, and when the mode signal Mode indicates that the controller 10 is the slave controller, the selecting and outputting circuit 51 provides the reference signal Vref0 based on the threshold voltage Vth. In the example of FIG. 6, the reference signal Vref0 is a digital signal, and the voltage reference circuit 204 further comprises a DAC 52. The DAC 52 is employed to convert the reference signal Vref0 to an analog signal, i.e., a reference signal Vref1. In one embodiment, the voltage reference signal Vref is the reference signal Vref1. In another embodiment, the voltage reference signal Vref further comprises a ramp signal VRAMP. For example, the voltage reference circuit 204 provides the voltage reference signal Vref via an operation circuit 54, such that the voltage reference signal Vref equals a sum of the reference signal Vref1 and the ramp signal VRAMP. The ramp signal VRAMP could be introduced to improve stability of the multiphase switching converter 100. One with ordinary skill in the art should understand that the voltage reference circuit 204 is not limited by the detailed circuit structure shown in FIG. 6, other circuit structure may also be employed without detracting merits of the present invention.

Figure 7A:
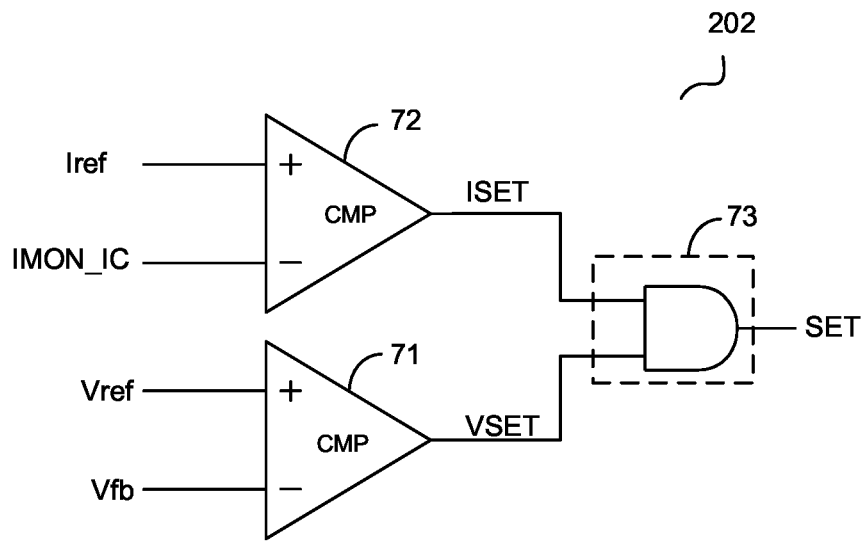
FIG. 7A is a schematic diagram of a set signal generating circuit 202 as shown in FIG. 4 in accordance with an embodiment of the present invention.

FIG. 7A is a schematic diagram of the set signal generating circuit 202 as shown in FIG. 4 in accordance with an embodiment of the present invention. In one embodiment, the set signal generating circuit 202 provides the set signal SET via comparing the total current signal IMON_IC with the current reference signal Iref, and comparing the feedback signal Vfb with the voltage reference signal Vref. In one embodiment, the set signal SET is configured to turn on one of the switching circuits 20 when the total current signal IMON_IC is less than the current reference signal Iref and the feedback signal Vfb is less than the voltage reference signal Vref. As shown in FIG. 7A, the set signal generating circuit 202 comprises a comparator 71, a comparator 72, and a logic circuit 73. The comparator 71 receives the feedback signal Vfb and the voltage reference signal Vref, and provides a comparison signal VSET via comparing the feedback signal Vfb with the voltage reference signal Vref. The comparator 72 receives the total current signal IMON_IC and the current reference signal Iref, and provides a comparison signal ISET via comparing the total current signal IMON_IC with the current reference signal Iref. The logic circuit 73 receives the comparison signal VSET and the comparison signal ISET, and provides the set signal SET based on the comparison signal VSET and the comparison signal ISET. In one example, the logic circuit 73 is but not be limited as an AND gate.

Figure 7B:
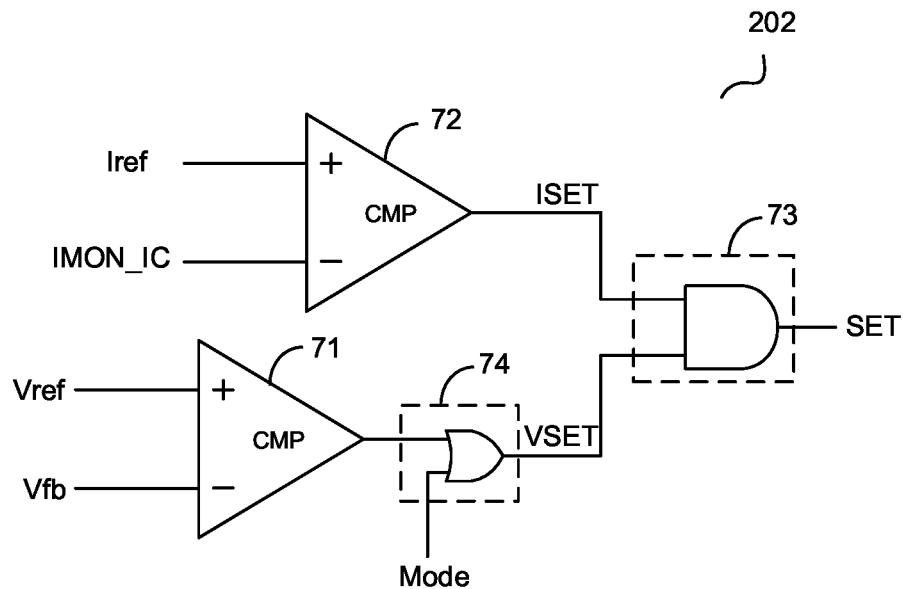
FIG. 7B is a schematic diagram of the set signal generating circuit 202 as shown in FIG. 4 in accordance with an embodiment of the present invention.

FIG. 7B is a schematic diagram of the set signal generating circuit 202 as shown in FIG. 4 in accordance with another embodiment of the present invention. In one embodiment, when the controller 10 is configured as the slave controller, the set signal SET is configured to turn on one of the switching circuits 20 when the total current signal IMON_IC is less than the current reference signal Iref, no matter if the feedback signal Vfb is less than the voltage reference signal Vref. As shown in FIG. 7B, the set signal generating circuit 202 further comprises a logic circuit 74. The logic circuit 74 is employed to blank the comparison result between the feedback signal Vfb and the voltage reference signal Vref when the mode signal Mode indicates that the controller 10 is the slave controller. In one example, the logic circuit 74 is an OR gate. The OR gate has a first input terminal coupled to an output terminal of the comparison circuit 71, a second input terminal configured to receive the mode signal Mode, and an output terminal configured to provide the comparison signal VSET via an "or" operation.

Figure 7C:
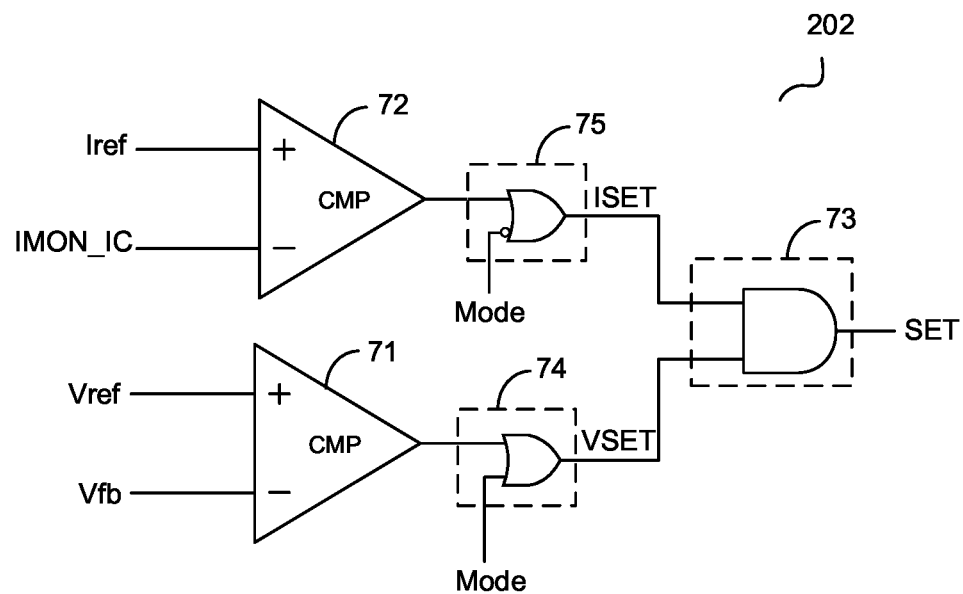
FIG. 7C is a schematic diagram of the set signal generating circuit 202 as shown in FIG. 4 in accordance with an embodiment of the present invention.

FIG. 7C is a schematic diagram of the set signal generating circuit 202 as shown in FIG. 4 in accordance with another embodiment of the present invention. In one embodiment, when the controller 10 is configured as the master controller, the set signal SET is configured to turn on one of the switching circuits 20 when the feedback signal Vfb is less than the voltage reference signal Vref, no matter if the total current signal IMON_IC is less than the current reference signal Iref. As shown in FIG. 7C, the set signal generating circuit 202 further comprises a logic circuit 75. The logic circuit 75 is employed to blank the comparison result between the total current signal IMON_IC and the current reference signal Iref when the mode signal Mode indicates that the controller 10 is the master controller. In one example, the logic circuit 75 is an OR gate. The OR gate has a first input terminal coupled to an output terminal of the comparison circuit 72, a second input terminal configured to receive an inversion signal of the mode signal Mode, and an output terminal configured to provide the comparison signal ISET via the "or" operation.

One with ordinary skill in the art should understand that the set signal generating circuit 202 is not limited by the detailed circuit structure shown in FIGS. 7A-7C, other circuit structure may also be employed without detracting merits of the present invention.

Figure 8:
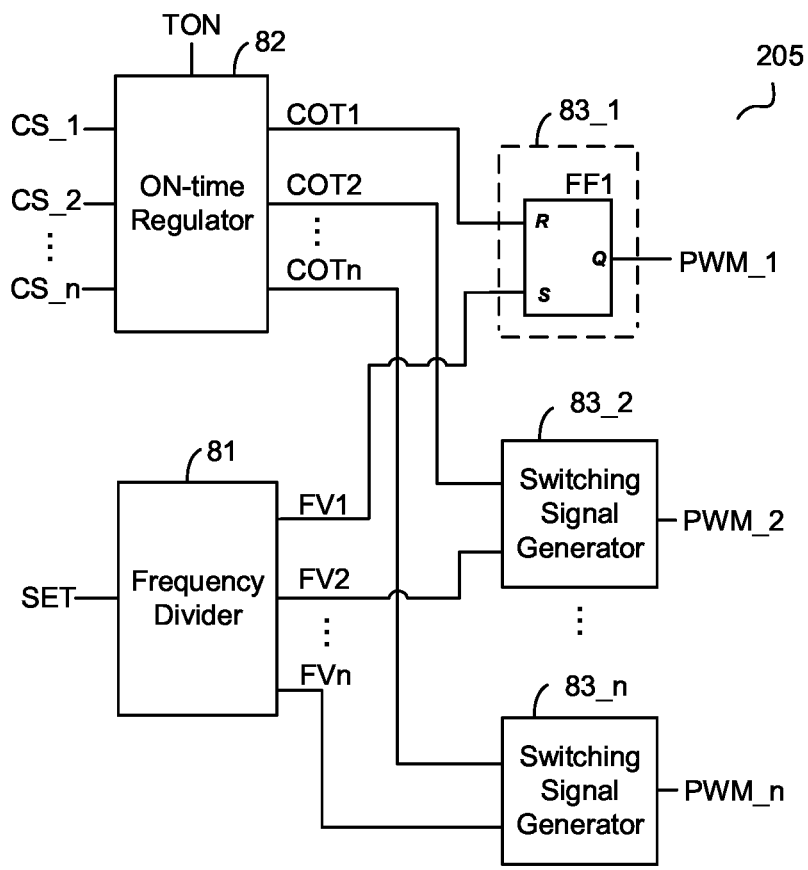
FIG. 8 is a schematic diagram of a PWM circuit 205 as shown in FIG. 4 in accordance with another embodiment of the present invention.

FIG. 8 is a schematic diagram of the PWM circuit 205 as shown in FIG. 4 in accordance with an embodiment of the present invention. One with ordinary skill in the art should understand that FIG. 8 is one example of the PWM circuit 205, other suitable circuit could also be employed without detracting merits of the present invention. As shown in FIG. 8, the PWM circuit 205 comprises a frequency divider 81, an ON-time regulator 82, and a plurality of switching signal generators 83 (e.g., 83_1, 83_2 . . . 83_n). The frequency divider 81 receives the set signal SET, and distributing pulses on the set signal SET to a plurality of frequency division signals FV (e.g., FV1, FV2 . . . FVn) via frequency division. The ON-time regulator 82 receives the ON-time control signal TON and the plurality of current sense signals CS, and provides a plurality of time thresholds COT (e.g., COT1, COT2 . . . COTn) based on the ON-time control signal TON and the plurality of current sense signals CS (e.g., CS_1, CS_2 . . . CS_n). In one embodiment, the plurality of time thresholds COT equals with each other. In another embodiment, each of the plurality of time thresholds COT are distinctive to adjust the ON-time period of one of the plurality of switching circuits 20 based on a current flowing through the one of the plurality of switching circuits 20, such that the controller 10 could control the ON-time period TON of each switching circuit 20 individually to balance the current flowing through each switching circuit 20. Each switching signal generator 83 provides one of the plurality of switching control signals PWM based on one of the plurality of frequency division signals FV and one of the plurality of time thresholds COT.

In one embodiment, each switching signal generator 83_i comprises a flip flop. FIG. 8 takes the switching signal generator 83_1 as one example for illustration. The switching signal generator 83_1 comprises a flip flop FF1. The flip flop FF1 has a set terminal S coupled to the frequency divider 81 to receive the frequency division signal FV1, a reset terminal R coupled to the ON-time regulator 82 to receive the time threshold COT1, and an output terminal Q to provide the switching control signal PWM_1.

Figure 9:
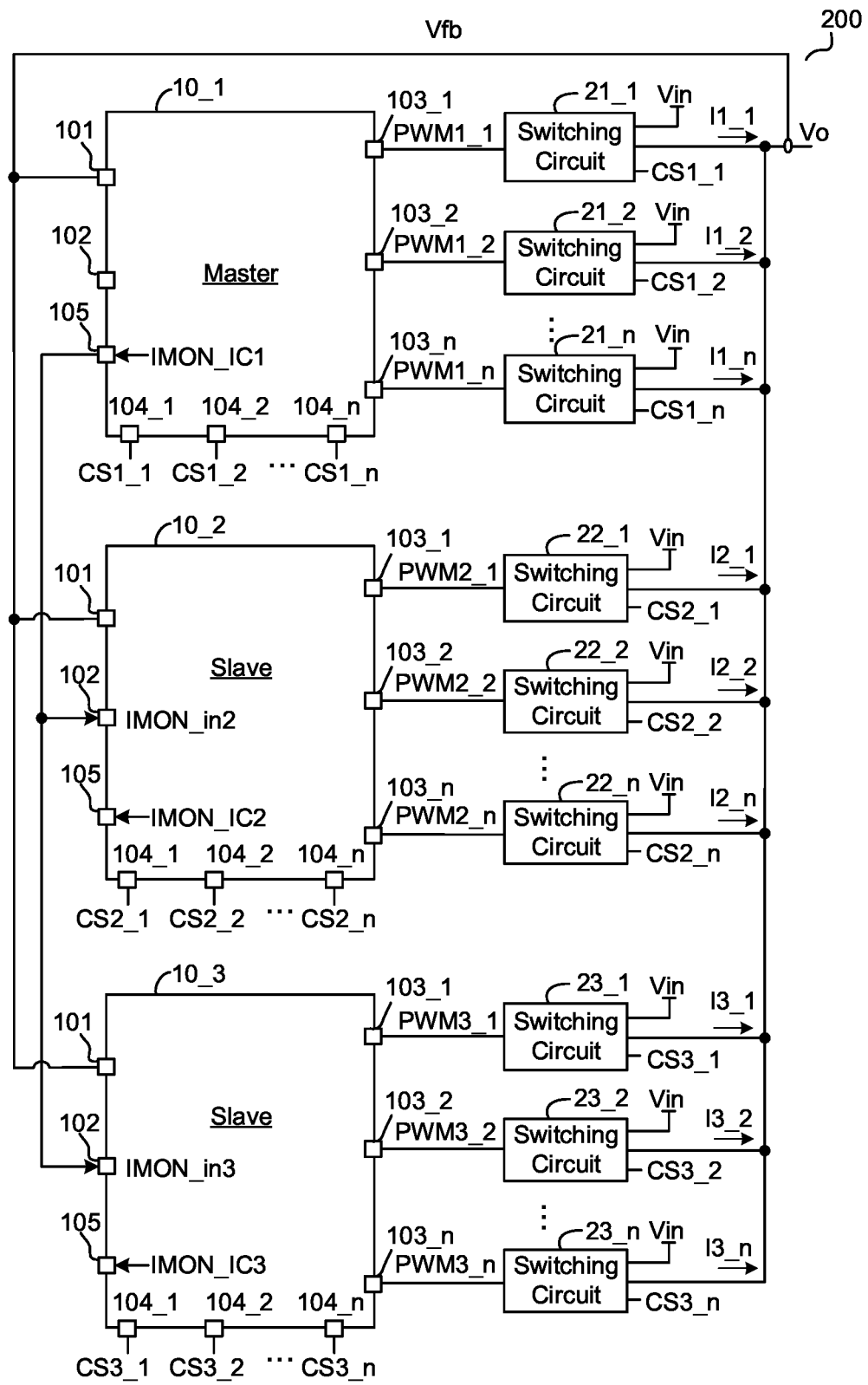
FIG. 9 is a schematic block diagram of a multiphase switching converter 200 in accordance with an embodiment of the present invention.

FIG. 9 is a schematic block diagram of a multiphase switching converter 200 in accordance with an embodiment of the present invention. The multiphase switching converter 200 comprises a plurality of switching circuits 21 (e.g., 21_1, 21_2 . . . 21_n), a plurality of switching circuits 22 (e.g., 22_1, 22_2 . . . 22_n), a plurality of switching circuits 23 (e.g., 23_1, 23_2 . . . 23_n), a controller 10_1, a controller 10_2, and a controller 10_3. In FIG. 9, the controller 10_1 is the master controller, and the controller 10_2 and the controller 10_3 are the slave controllers. Although FIG. 9 shows one master controller and two slave controllers as one example, one with ordinary skill in the art should understand that the multiphase switching converter 200 may comprise more or less slave controllers, not limited by the example of FIG. 9.

Each of the plurality of switching circuits 21-23 are coupled in parallel with each other to provide the output voltage Vo. The master controller 10_1 is configured to provide a plurality of switching control signals PWM1 (e.g., PWM1_1, PWM1_2 . . . PWM1_$n$) via the plurality of switching control pins 103 of the master controller 10_1 based on the output voltage Vo to control the plurality of switching circuits 21. The master controller 10_1 is configured to provide a total current signal IMON_IC1 based on a sum of currents flowing through the switching circuits 21 (I1_1+I1_2+ . . . +I1_$n$). The reference pin 105 of the master controller 10_1 is coupled to the feedback pin 102 of the slave controller 10_2 and the feedback pin 102 of the slave controller 10_3 to share the total current signal IMON_IC1, and the slave controller 10_2 and the slave controller 10_3 take the total current signal IMON_IC1 of the master controller 10_1 as its total current signal IMON_in respectively, i.e., as a total current signal IMON_in2 by the salve controller 10_2, and as a total current signal IMON_in3 by the slave controller 10_3. The slave controller 10_2 is configured to provide a total current signal IMON_IC2 of the slave controller 10_2 based on a sum of currents flowing through the switching circuits 22 (I2_1+I2_2+ . . . +I2_$n$). The slave controller 10_2 is configured to provide a plurality of switching control signals PWM2 (e.g., PWM2_1, PWM2_2 . . . PWM2_$n$) via the plurality of switching control pins 103 of the slave controller 10_2 to control the switching circuits 22. The slave controller 10_3 is configured to provide a total current signal IMON_IC3 of the slave controller 10_3 based on a sum of currents flowing through the switching circuits 23 (I3_1+I3_2+ . . . +I3_$n$). The slave controller 10_3 is configured to provide a plurality of switching control signals PWM3 (e.g., PWM3_1, PWM3_2 . . . PWM3_$n$) via the plurality of switching control pins 103 of the slave controller 10_3 to control the switching circuits 23.

Detailed circuit structure of the master controller 10_1, the slave controller 10_2, or the slave controller 10_3 is similar with the controller 10 shown in FIGS. 1-8. With embodiments of present invention, current balance between switching circuits controlled by different controller could be achieved easily. That is a total current provided by the switching circuits 21, a total current provided by the switching circuits 22, and a total current provided by the switching circuits 23 could be balanced with each other.

Figure 10:
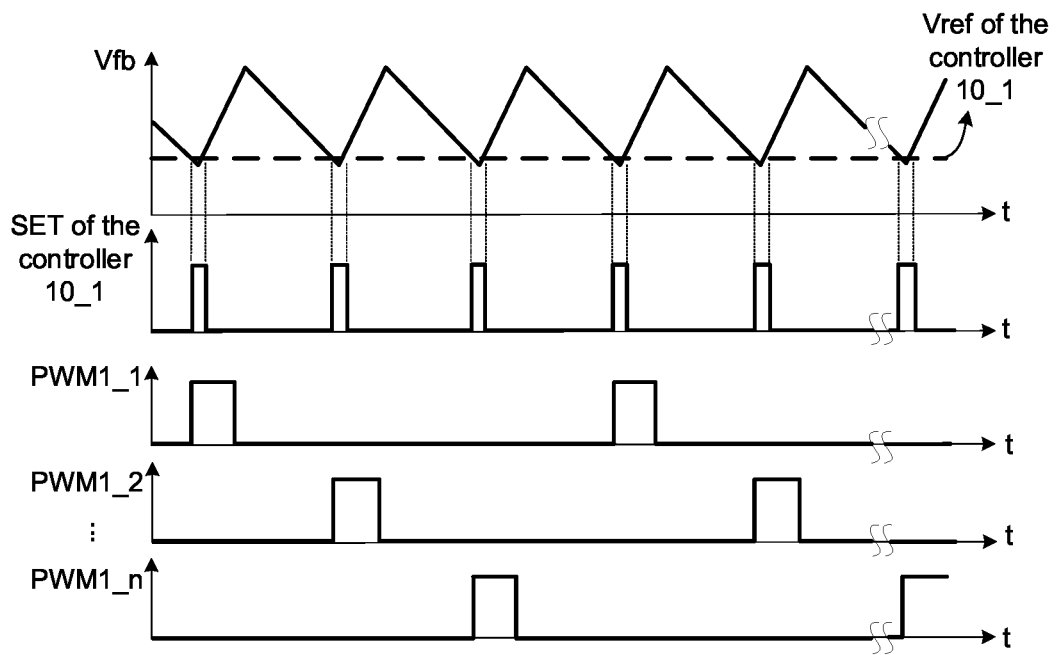
FIG. 10 shows waveforms of the multiphase switching converter 200 shown in FIG. 9 in accordance with an embodiment of the present invention.

FIG. 10 shows waveforms of the multiphase switching converter 200 shown in FIG. 9 in accordance with an embodiment of the present invention. From top to bottom, FIG. 10 shows the feedback signal Vfb, the set signal SET of the controller 10_1, the switching control signals PWM1_1-PWM1_$n$. In one embodiment, the plurality of switching circuits 21 is turned on in sequence via the plurality of switching control signals PWM1_1, PWM1_2 . . . and PWM1_$n$ in response to a comparison result between the feedback signal Vfb and the voltage reference signal Vref. For example, as shown in FIG. 10, when the feedback signal Vfb is less than the voltage reference signal Vref, the set signal SET of the controller 10_1 transits to high, and one of the switching control signals PWM1_1, PWM1_2 . . . and PWM1_$n$ becomes high to turn on one of the plurality of switching circuits 21.

Figure 11:
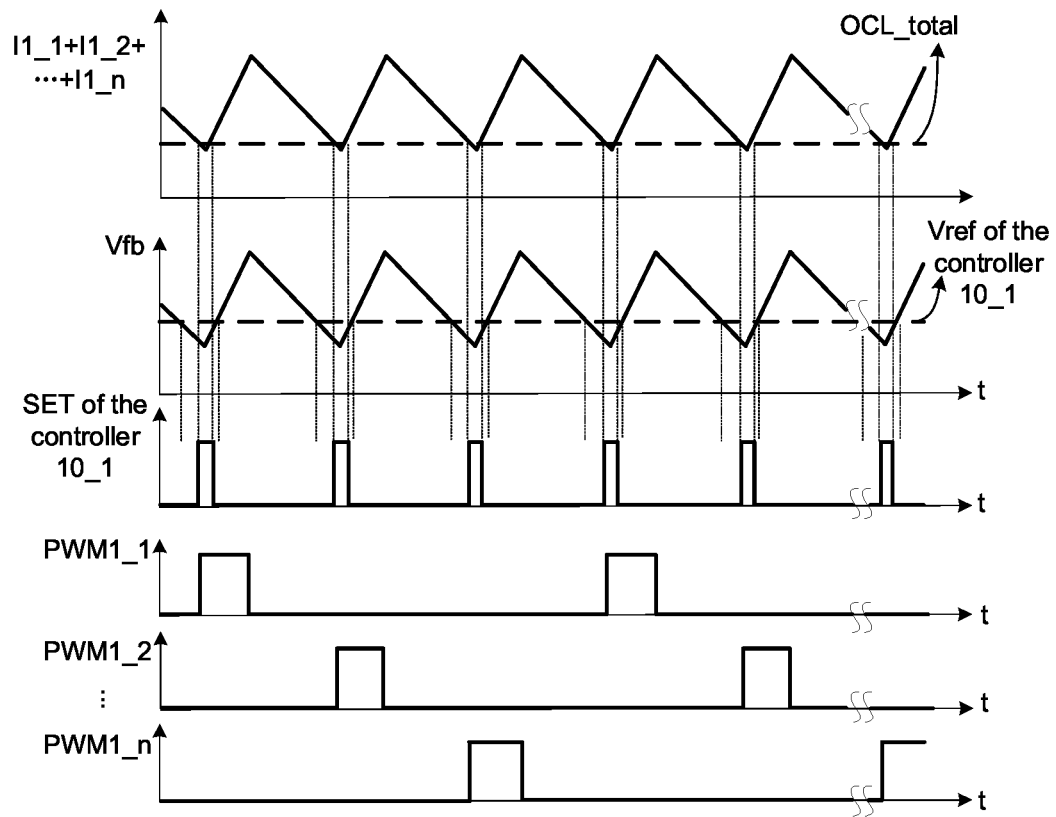
FIG. 11 shows waveforms of the multiphase switching converter 200 shown in FIG. 9 in accordance with another embodiment of the present invention.

FIG. 11 shows waveforms of the multiphase switching converter 200 shown in FIG. 9 in accordance with another embodiment of the present invention. From top to bottom, FIG. 11 shows the sum of the plurality of currents flowing through the switching circuits 21 (I1_1+I1_2+ . . . +I1_$n$), the feedback signal Vfb, the set signal SET of the controller 10_1, the switching control signals PWM1_1-PWM1_$n$. In one embodiment, the plurality of switching circuits 21 is turned on in sequence via the plurality of switching control signals PWM1_1, PWM1_2 . . . and PWM1_$n$ in response to the comparison result between the feedback signal Vfb and the voltage reference signal Vref and a comparison result between the sum of the currents flowing through the switching circuits 21 and the current limit threshold OCL_total. For example, as shown in FIG. 11, when the feedback signal Vfb is less than the voltage reference signal Vref, and when the sum of the currents flowing through the switching circuits 21 (I1_1+I1_2+ . . . +I1_$n$) is less than the current limit threshold OCL_total, the set signal SET of the controller 10_1 transits to high, and one of the switching control signals PWM1_1, PWM1_2 . . . and PWM1_$n$ becomes high to turn on one of the plurality of switching circuits 21.

Figure 12:
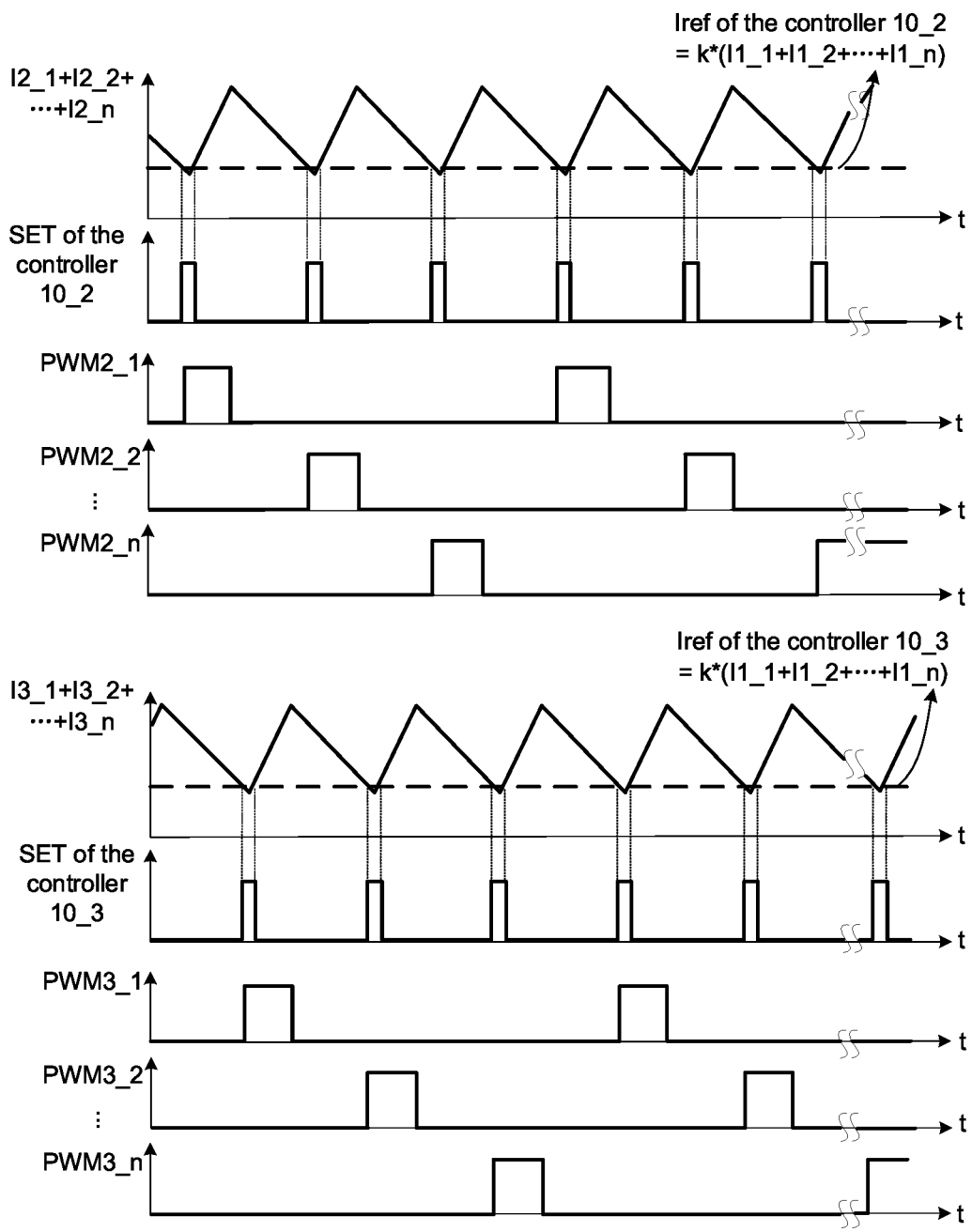
FIG. 12 shows waveforms of the multiphase switching converter 200 shown in FIG. 9 in accordance with another embodiment of the present invention.

FIG. 12 shows waveforms of the multiphase switching converter 200 shown in FIG. 9 in accordance with another embodiment of the present invention. From top to bottom, FIG. 12 shows the sum of the plurality of currents flowing through the switching circuits 22 (I2_1+I2_2+ . . . +I2_$n$), the set signal SET of the controller 10_2, the switching control signals PWM2_1-PWM2_$n$, the sum of the plurality of currents flowing through the switching circuits 23 (I3_1+I3_2+ . . . +I3_$n$), the set signal SET of the controller 10_3, and the switching control signals PWM3_1-PWM3_$n$.

In one embodiment, the plurality of switching circuits 22 is turned on in sequence via the plurality of switching control signals PWM2_1, PWM2_2 . . . and PWM2_$n$ in response to a comparison result between the sum of the plurality of currents flowing through the switching circuits 22 (I2_1+I2_2+ . . . +I2_$n$) and the current reference signal Iref of the controller 10_2. For example, as shown in FIG. 12, when the sum of the plurality of currents flowing through the switching circuits 22 (I2_1+I2_2+ . . . +I2_$n$) is less than the current reference signal Iref of the controller 10_2, the set signal SET of the controller 10_2 transits to high, and one of the switching control signals PWM2_1, PWM2_2 . . . and PWM2_$n$ becomes high to turn on one of the plurality of switching circuits 22. In one embodiment, the current reference Iref of the controller 10_2 equals $k*(I1\_1+I1\_2+ \ldots +I1\_n)$, k is constant.

In one embodiment, the plurality of switching circuits 23 is turned on in sequence via the plurality of switching control signals PWM3_1, PWM3_2 . . . and PWM3_$n$ in response to a comparison result between the sum of the plurality of currents flowing through the switching circuits 23 (I3_1+I3_2+ . . . +I3_$n$) and the current reference signal Iref of the controller 10_3. For example, as shown in FIG. 12, when the sum of the plurality of currents flowing through the switching circuits 23 (I3_1+I3_2+ . . . +I3_$n$) is less than the current reference signal Iref of the controller 10_3, the set signal SET of the controller 10_3 transits to high, and one of the switching control signals PWM3_1, PWM3_2 . . . and PWM3_$n$ becomes high to turn on one of the plurality of switching circuits 23. In one embodiment, the current reference Iref of the controller 10_3 equals the following $k*(I1\_1+I1\_2+ \ldots +I1\_n)$.

Figure 13:
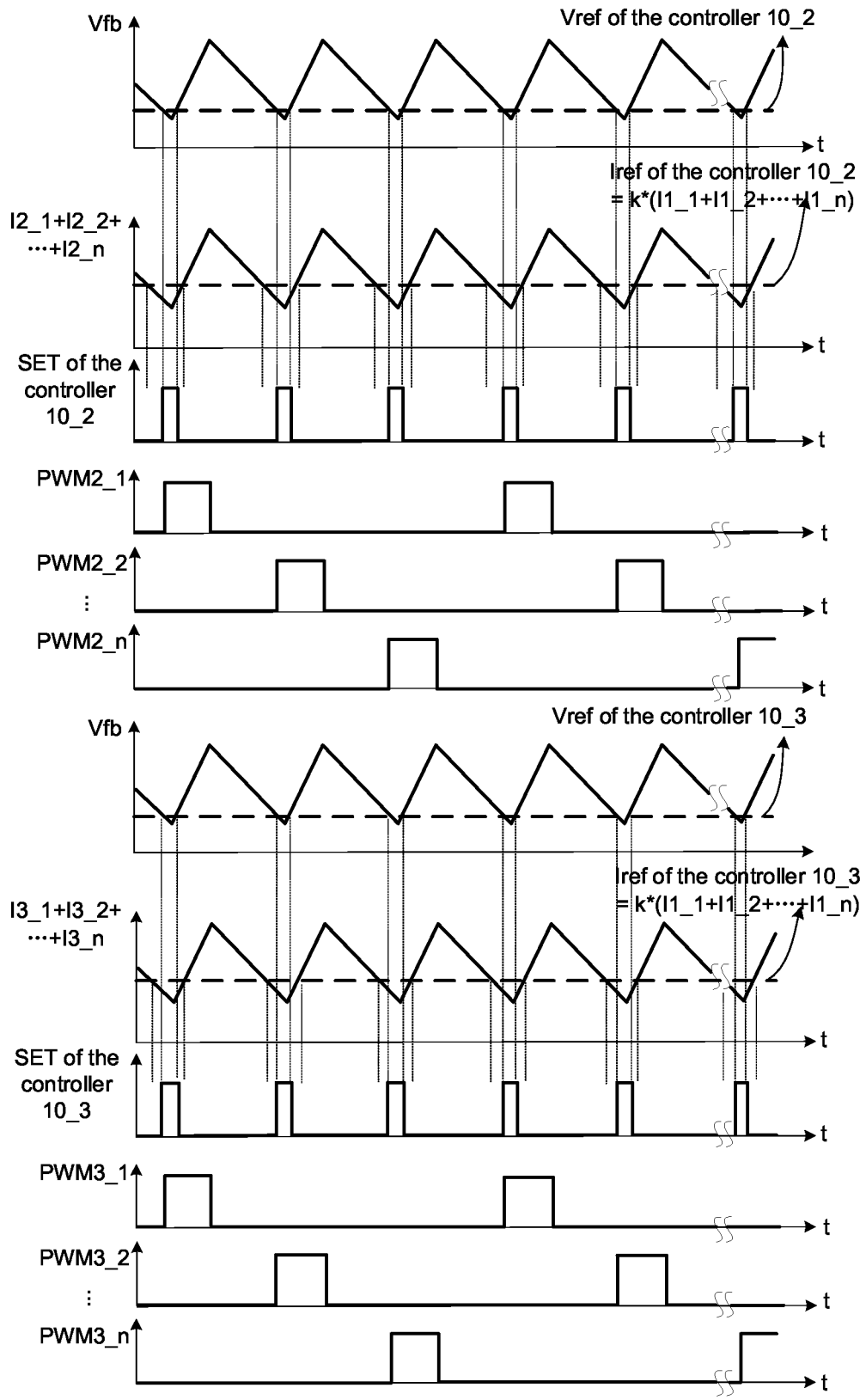
FIG. 13 shows waveforms of the multiphase switching converter 200 shown in FIG. 9 in accordance with another embodiment of the present invention.

FIG. 13 shows waveforms of the multiphase switching converter 200 shown in FIG. 9 in accordance with another embodiment of the present invention. From top to bottom, FIG. 13 shows the feedback signal Vfb, the sum of the plurality of currents flowing through the switching circuits 22 (I2_1+I2_2+ . . . +I2_n), the set signal SET of the controller 10_2, the switching control signals PWM2_1-PWM2_n, the sum of the plurality of currents flowing through the switching circuits 23 (I3_1+I3_2+ . . . +I3_n), the set signal SET of the controller 10_3, the switching control signals PWM3_1-PWM3_n.

In one embodiment, the plurality of switching circuits 22 is turned on in sequence via the plurality of switching control signals PWM2_1, PWM2_2 . . . and PWM2_n in response to a comparison result between the feedback signal Vfb and the voltage reference signal Vref of the controller 10_2 and the comparison result between the sum of the currents flowing through the switching circuits 22 (I2_1+I2_2+ . . . +I2_n) and the current reference signal Iref of the controller 10_2. For example, as shown in FIG. 13, when the feedback signal Vfb is less than the voltage reference signal Vref of the controller 10_2, and when the sum of the currents flowing through the switching circuits 22 (I2_1+I2_2+ . . . +I2_n) is less than the current reference signal Iref of the controller 10_2, the set signal SET of the controller 10_2 transits to high, and one of the switching control signals PWM2_1, PWM2_2 . . . and PWM2_n becomes high to turn on one of the plurality of switching circuits 22.

In one embodiment, the plurality of switching circuits 23 is turned on in sequence via the plurality of switching control signals PWM3_1, PWM3_2 . . . and PWM3_n in response to a comparison result between the feedback signal Vfb and the voltage reference signal Vref of the controller 10_3 and the comparison result between the sum of the currents flowing through the switching circuits 23 (I3_1+I3_2+ . . . +I3_n) and the current reference signal Iref of the controller 10_3. For example, as shown in FIG. 13, when the feedback signal Vfb is less than the voltage reference signal Vref of the controller 10_3, and when the sum of the currents flowing through the switching circuits 23 (I3_1+I3_2+ . . . +I3_n) is less than the current reference signal Iref of the controller 10_3, the set signal SET of the controller 10_3 transits to high, and one of the switching control signals PWM3_1, PWM3_2 . . . and PWM3_n becomes high to turn on one of the plurality of switching circuits 23.

Figure 14:
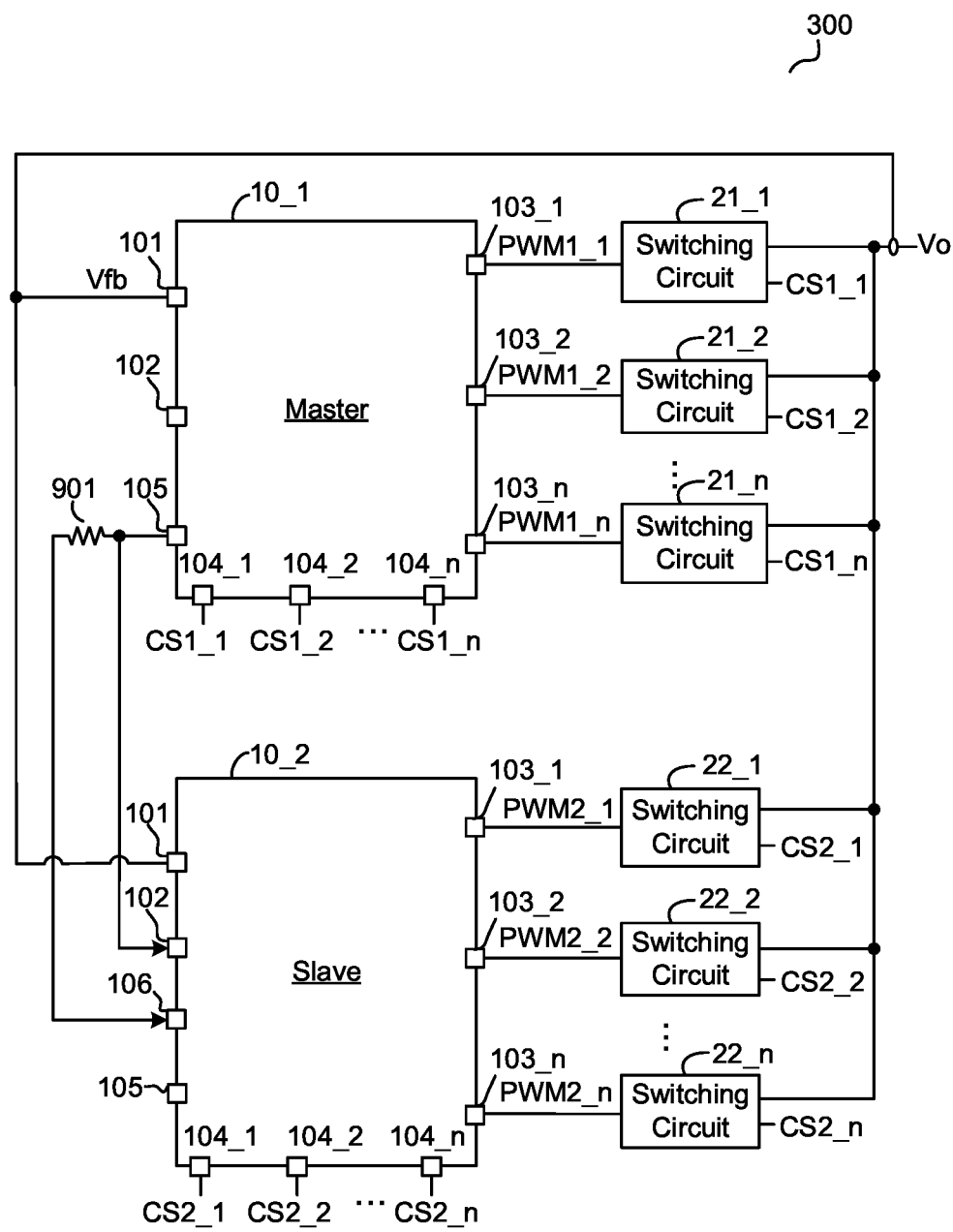
FIG. 14 is a schematic block diagram of a multiphase switching converter 300 in accordance with an embodiment of the present invention.

FIG. 14 is a schematic block diagram of a multiphase switching converter 300 in accordance with an embodiment of the present invention. Although FIG. 14 shows one master controller and one slave controller as one example, one with ordinary skill in the art should understand that the multiphase switching converter 300 may comprise more slave controllers, not limited by the example of FIG. 14. As shown in FIG. 14, the reference pin 105 of the master controller 10_1 is coupled to a resistor 901 to provide the total current signal IMON_IC across the resistor 901. The slave controller 10_2 is coupled to the resistor 901 to receive the total current signal IMON_IC provided by the master controller 10_1 as its total current signal IMON_in. As shown in FIG. 14, the slave controller 10_2 further comprises a reference ground pin 106, the feedback pin 102 of the slave controller 10_2 is coupled to a first terminal of the resistor, and the reference ground pin 106 is coupled to a second terminal of the resistor 902.

Figure 15:
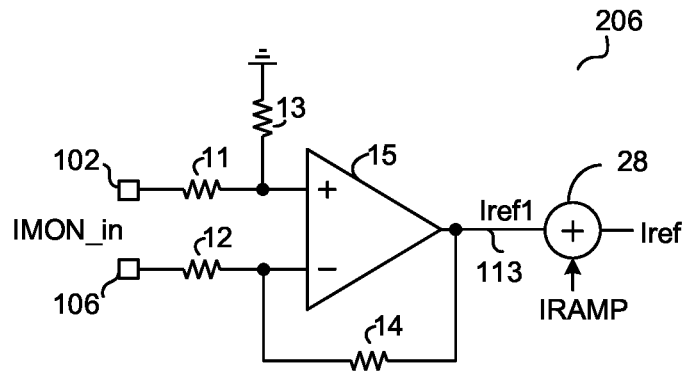
FIG. 15 is a schematic diagram of the current reference circuit 206 employed by a slave controller 10_2 shown in FIG. 14 in accordance with another embodiment of the present invention.

FIG. 15 is a schematic diagram of the current reference circuit 206 employed by the slave controller 10_2 shown in FIG. 14 in accordance with an embodiment of the present invention. In the example of FIG. 15, the current reference circuit 206 has a first terminal coupled to the first terminal of the resistor 901 via the feedback pin 102, a second terminal coupled to the second terminal of the resistor 901 via the reference ground pin 106, and an output terminal configured to provide the current reference signal Iref based on a differential voltage across the resistor 901. As shown FIG. 15, the current reference circuit 206 comprises an amplifier 15. An inverting terminal of the amplifier 15 is coupled to the second terminal of the resistor 901 via a resistor 12, a non-inverting terminal of the amplifier 15 is coupled to the first terminal of the resistor 901 via a resistor 11. The inverting terminal of the amplifier 15 is coupled to an output terminal 113 via a resistor 14, and the non-inverting terminal of the amplifier 15 is coupled to a reference ground via a resistor 13.

Figure 16:
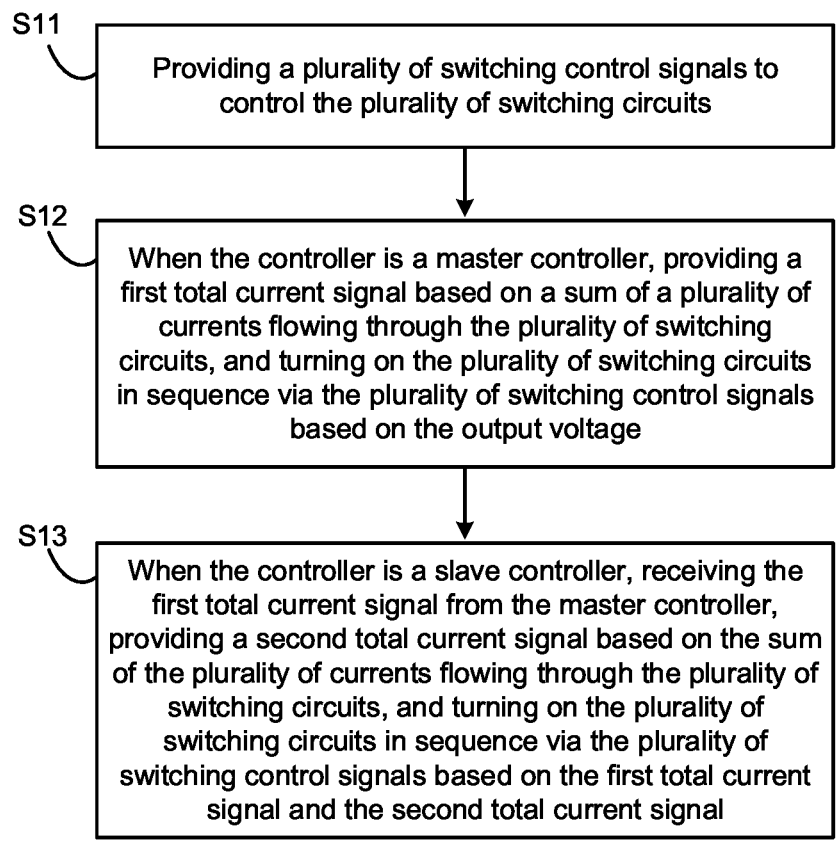
FIG. 16 is a flowchart of a control method 1200 for a controller of a multiphase switching converter in accordance with an embodiment of the present invention.

FIG. 16 a flowchart of a control method 1200 for a controller of a multiphase switching converter in accordance with an embodiment of the present invention. The control method comprises steps S11-S13. The multiphase switching converter has a plurality of switching circuits coupled in parallel to provide an output voltage from an input voltage.

At the step S11, providing a plurality of switching control signals to control the plurality of switching circuits.

At the step S12, when the controller is a master controller, providing a first total current signal based on a sum of a plurality of currents flowing through the plurality of switching circuits, and turning on the plurality of switching circuits in sequence via the plurality of switching control signals based on the output voltage.

At the step S13, when the controller is a slave controller, receiving the first total current signal from the master controller, providing a second total current signal based on the sum of the plurality of currents flowing through the plurality of switching circuits, and turning on the plurality of switching circuits in sequence via the plurality of switching control signals based on the first total current signal and the second total current signal.

Figure 17:
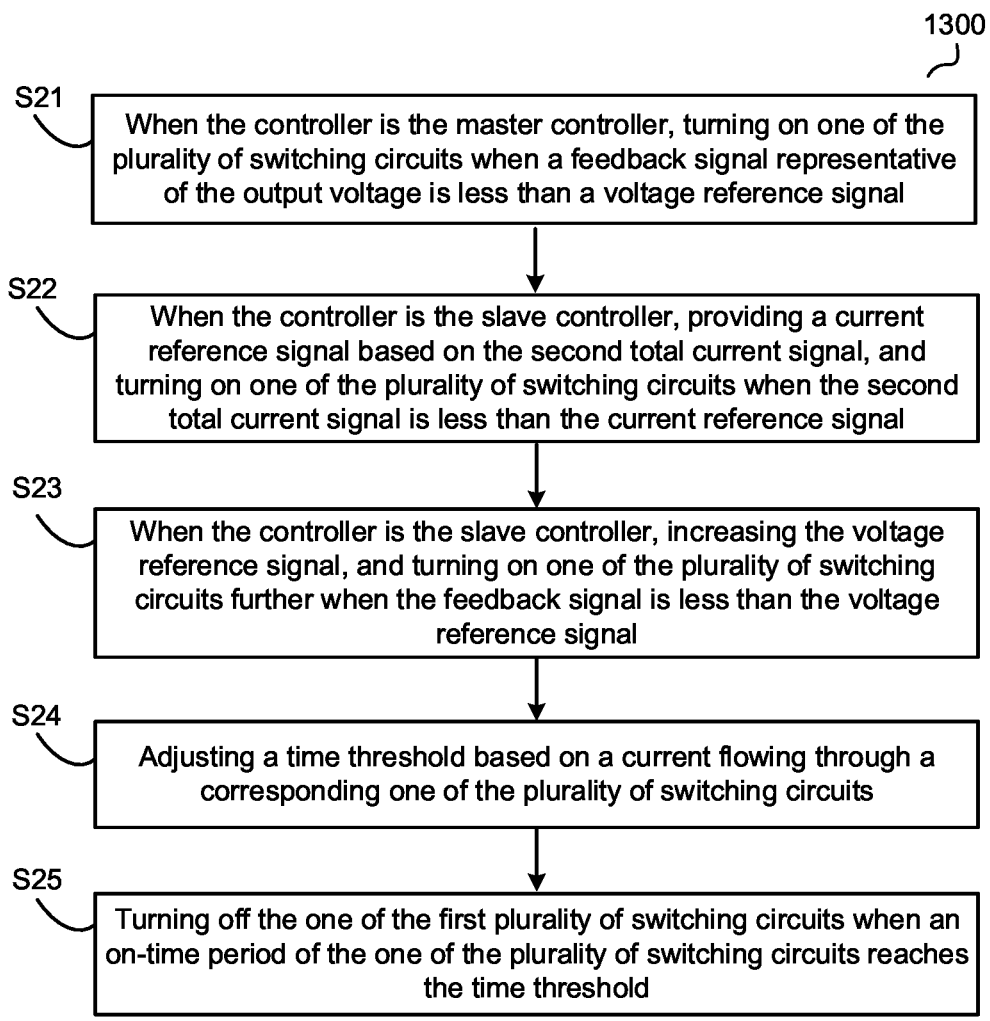
FIG. 17 is a flowchart of a control method 1300 for the controller of the multiphase switching converter in accordance with an embodiment of the present invention.

FIG. 17 a flowchart of a control method 1300 for the controller of the multiphase switching converter in accordance with an embodiment of the present invention. The method comprises steps S21-S25.

At the step S21, when the controller is the master controller, turning on one of the plurality of switching circuits when a feedback signal representative of the output voltage is less than a voltage reference signal.

At the step S22, when the controller is the slave controller, providing a current reference signal based on the first total current signal, and turning on one of the plurality of switching circuits when the second total current signal is less than the current reference signal.

At the step S23, when the controller is the slave controller, increasing the voltage reference signal, and turning on one of the plurality of switching circuits further when the feedback signal is less than the voltage reference signal.

At the step S24, adjusting a time threshold based on a current flowing through one of the plurality of switching circuits.

At the step S25, turning off the one of the plurality of switching circuits when an ON-time period of the one of the plurality of switching circuits reaches the time threshold.

Note that in the flowchart described above, the functions indicated in the boxes can also occur in a different order than those shown in the figure. Fox example, two boxes presented one after another can actually be executed essentially at the same time, or sometimes in reverse order, depending on the specific functionality involved.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What is claimed is:

1. A controller for a multiphase switching converter, comprising:
    a first feedback pin capable of receiving a feedback signal representative of an output voltage of the multiphase switching converter;
    a plurality of switching control pins capable of providing a plurality of switching control signals to control a plurality of switching circuits of the multiphase switching converter;
    a second feedback pin capable of receiving a first total current signal from another controller for another multiphase switching converter:
    a plurality of current sense pins capable of receiving a plurality of current sense signals representative of a plurality of currents flowing through the plurality of switching circuits respectively; and
    a logic circuit, configured to generate the plurality of switching control signals to control the plurality of switching circuits at least based on the plurality of current sense signals and the first total current signal.

2. The controller of claim 1, wherein the controller is configured to provide a current reference signal based on the first total current signal, and one of the plurality of switching circuits is turned on when a second total current signal is less than the current reference signal, wherein the second total current signal is generated based on a sum of the plurality of currents flowing through the plurality of switching circuits.

3. The controller of claim 1, wherein:
    the controller is configured to turn on one of the plurality of switching circuits when a sum of the plurality of currents flowing through the plurality of switching circuits is less than a current reference signal which is provided based on the first total current signal.

4. The controller of claim 1, wherein the controller is configured to generate the plurality of switching control signals further based on the feedback signal, and wherein the controller is configured to turn on one of the plurality of switching circuits based on the feedback signal, a voltage reference signal, a sum of the plurality of currents flowing through the plurality of switching circuits, and a current reference signal which is provided based on the first total current signal.

5. The controller of claim 1, wherein the logic circuit further comprises:
    a current reference circuit configured to provide a current reference signal based on the first total current signal;
    a voltage reference circuit configured to provide a voltage reference signal based on a desired output voltage;
    a first comparator coupled to the current reference circuit, wherein the first comparator is configured to provide a first comparison signal based on the plurality of current sense signals and the current reference signal; and
    a second comparator coupled to the voltage reference circuit, wherein the second comparator is configured to provide a second comparison signal based on the feedback signal and the voltage reference signal; wherein
    the logic circuit is configured to generate the plurality of switching control signals based on the first comparison signal and the second comparison signal.

6. The controller of claim 1, wherein the logic circuit further comprises:
    a set signal generating circuit, configured to provide a set signal to turn on one of the plurality of switching circuits based on the first total current signal and a sum of the plurality of currents flowing through the plurality of switching circuits;
    an ON-time control circuit, configured to provide an ON-time control signal to turn off one of the plurality of switching circuits; and
    a PWM circuit, configured to provide the plurality of switching control signals based on the set signal and the ON-time control signal.

7. The controller of claim 1, wherein:
    the logic circuit is configured to turn off one of the plurality of switching circuits when an ON-time period of one of the plurality of switching circuits reaches a time threshold; and
    the time threshold is adjusted based on a current flowing through one of the plurality of switching circuits.

8. A control method for a multiphase switching converter, comprising:
    receiving a feedback signal representative of an output voltage of the multiphase switching converter;
    receiving a first total current signal from another controller for another multiphase switching converter;
    receiving a plurality of current sense signals representative of a plurality of currents flowing through a plurality of switching circuits respectively; and
    providing a plurality of switching control signals to control the plurality of switching circuits based on the feedback signal, the plurality of current sense signals and the first total current signal.

9. The control method of claim 8, further comprising: providing a current reference signal based on the first total current signal, and turning on one of the plurality of switching circuits based on the feedback signal, a voltage reference signal, a second total current signal, and the current reference signal, wherein the second total current signal is generated based on the plurality of current sense signals.

10. The control method of claim 9, wherein the voltage reference signal is higher than a voltage level that the output voltage should be regulated to.

11. The control method of claim 8, further comprising:
    adjusting a time threshold based on a current flowing through one of the plurality of switching circuits; and
    turning off one of the plurality of switching circuits when an ON-time period of one of the plurality of switching circuits reaches the time threshold.

12. The controller of claim 4, wherein the voltage reference signal is higher than a voltage level that the output voltage should be regulated to.

13. The controller of claim 1, wherein the logic circuit is configured to generate the plurality of switching control signals further based on the feedback signal and a voltage reference signal.

14. A controller for a multiphase switching converter, comprising:
    a feedback pin capable of receiving a feedback signal representative of an output voltage of the multiphase switching converter;

a plurality of switching control pins capable of providing a plurality of switching control signals to control a plurality of switching circuits of the multiphase switching converter;

a reference pin capable of providing a total current signal to another controller for another multiphase switching converter based on at least one of a plurality of currents flowing through the plurality of switching circuits;

a plurality of current sense pins capable of receiving a plurality of current sense signals representative of the plurality of currents flowing through the plurality of switching circuits respectively; and a logic circuit, configured to generate the plurality of switching control signals to control the plurality of switching circuits based on the feedback signal, a voltage reference signal, a sum of the plurality of current sense signals, and a current reference signal.

15. The controller of claim 14, wherein the logic circuit comprises:

a first comparator configured to provide a first comparison signal based on the sum of the plurality of current sense signals and the current reference signal;

a second comparator configured to provide a second comparison signal based on the feedback signal and the voltage reference signal;

a set signal generating circuit coupled to the first comparator and the second comparator, wherein the set signal generating circuit is configured to provide a set signal to turn on one of the plurality of switching circuits based on the first comparison signal and the second comparison signal;

an ON-time control circuit configured to provide an ON-time control signal to turn off one of the plurality of switching circuits; and a PWM circuit, configured to provide the plurality of switching control signals based on the set signal and the ON-time control signal.

16. The controller of claim 14, wherein the controller is configured to provide the total current signal based on a sum of the plurality of currents flowing through the plurality of switching circuits.

* * * * *